(12) United States Patent
Doran (10) Patent No.: US 8,230,225 B2
(45) Date of Patent: Jul. 24, 2012

(54) METHOD AND SYSTEM FOR CERTIFIED PUBLICATION OF CONTENT

(75) Inventor: Christopher M. Doran, Sunnyvale, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1410 days.

(21) Appl. No.: 11/375,163

(22) Filed: Mar. 14, 2006

(65) Prior Publication Data

US 2007/0240195 A1    Oct. 11, 2007

(51) Int. Cl.
*H04L 29/06* (2006.01)
(52) U.S. Cl. .............................. 713/176; 713/185; 726/1
(58) Field of Classification Search .................. 713/176
See application file for complete search history.

(56) References Cited

U.S. PATENT DOCUMENTS

| | | | |
|---|---|---|---|
| 6,314,425 B1 * | 11/2001 | Serbinis et al. | 707/10 |
| 6,622,247 B1 * | 9/2003 | Isaak | 713/155 |
| 6,718,328 B1 * | 4/2004 | Norris | 707/9 |
| 7,051,370 B2 * | 5/2006 | Wakino | 726/30 |
| 7,574,479 B2 * | 8/2009 | Morris et al. | 709/207 |
| 2002/0016925 A1 | 2/2002 | Pennec et al. | |
| 2002/0059364 A1 * | 5/2002 | Coulthard et al. | 709/203 |
| 2004/0243808 A1 * | 12/2004 | Ishiguro et al. | 713/176 |
| 2005/0177528 A1 * | 8/2005 | Qamar | 705/404 |
| 2006/0080546 A1 * | 4/2006 | Brannon et al. | 713/185 |

FOREIGN PATENT DOCUMENTS

| | | |
|---|---|---|
| WO | WO 00/59177 | 10/2000 |
| WO | WO 02/082716 | 10/2002 |

OTHER PUBLICATIONS

Brisola et al. A Public Keys Based Architecture for P2P Indentification, Content Authenticity and Reputation. 2009 International Conference on Advanced Information Networking and Applications Workshops.*
International Search Report and Written Opinion of International Searching Authority from International Application No. PCT/US2007/002161, dated Jul. 19, 2007.

* cited by examiner

*Primary Examiner* — Taghi Arani
*Assistant Examiner* — Narciso Victoria (57) ABSTRACT

A method and system for certified publication of content. A content-supplier provides content and supplies an access-server with a content-description and digital signature. A content-certifier obtains an access-token from the access-server and submits the access-token to the content-supplier with a request to obtain the content to be certified. The content-supplier works with the access-server to validate the token and then provides the content to the content-certifier. After validating the digital signature, the content-certifier certifies the content and provides a certification-flag to the access-server, and the access-server updates a content-catalog entry for the content to indicate that the content is certified. An analogous process can be carried out to thereafter deliver the content to a third party. The invention is particularly useful to facilitate certification of test scripts, but the invention can be used in other contexts as well, such as to certify media in a peer-to-peer distribution system.

13 Claims, 4 Drawing Sheets

METHOD AND SYSTEM FOR CERTIFIED PUBLICATION OF CONTENT

FIELD OF THE INVENTION

The present invention relates to network communications and, more particularly, to the publication of content on a communication network for access by others.

BACKGROUND

In many instances, it is desirable to publish content on a communication network for access by others. The content may take various forms, examples of which include digital media such as music or video, and computer programs or scripts such as games, utilities, test scripts, and productivity software, for instance.

One way to publish content on a communication network is to store the content on a network server and to post an online catalog-entry that provides a link to the content, so that others can browse the catalog and selectively download the content by clicking on the link. For instance, an online content host might maintain a content-catalog, and a content provider might store content on a network server and arrange with the content host to list the provider's content in the content-catalog. When a user browses the host's content-catalog, the user may then opt to download the provider's content, by clicking on an associated link for instance, which may cause the content to be communicated from the provider's server to the user's computer. This content-publication arrangement could underlie an online content store, a peer-to-peer content sharing service, or other services.

A risk in this or other content-publication processes, however, is that a content-supplier may either deliberately or inadvertently provide a content file that contains bogus, harmful, inoperable, unauthorized, and/or otherwise unacceptable data. For example, a content-supplier might post or otherwise make available in an online content-catalog a link or listing for a particular media file (such as song or video), but the associated file may in fact contain some other media (e.g., a different song or video) or some other sort of data altogether. As another example, a content-supplier might post or otherwise make available in an online content-catalog a link or listing for a particular computer program or test script that supposedly defines or carries out particular functions, but the associated file(s) may in fact not define or carry out those functions, or may not do so satisfactorily. Unfortunately in these or similar situations, a user may unwittingly download listed content believing the content to be legitimate and satisfactory, only to find out later that the content is not in fact what it purports to be or is otherwise not fit for its intended purpose. Consequently, an improvement is desired.

SUMMARY

The present invention provides a mechanism for certified publication of content, to help ensure that content being published is what it purports to be, or at least that it has a predefined or expected characteristic. Advantageously, the invention can thereby help to protect an end user who innocently acquires the content for a particular purpose.

To invention can be usefully employed to facilitate certified publication of test scripts that are designed to enable testing of cell phones or other equipment, such as to ensure that the equipment meets certain requirements. Further, the invention can be employed to facilitate certified publication of other sorts of content as well, including but not limited to media files such as audio or video files, computer programs or other test scripts, and other types of content now known or later developed.

In an exemplary embodiment, the invention can be carried out among three computers (or computer systems, e.g., client workstations and servers) that are communicatively linked together through one or more communication networks. One of the computers may function as an access server, hosting a content-catalog that lists available content and indicates whether the content is certified. Another computer may function as a content-supplier to provide requesting-parties with the content. And another computer may function as a content-certifier, to provide the access-server with an indication that the content has been certified, so that the access server's content-catalog can be set to indicate that the content has been certified. These computers may be commonly owned and operated or may be owned and operated by separate companies or other entities.

In practice, the process may begin with the content-supplier transmitting to the access server a catalog-entry that includes (i) a description of content to be published and (ii) a digital signature for the content (e.g., a digital signature that was generated by the content-supplier before supplying the content to the access server). At some point thereafter, the access server may then receive a request from the content-certifier to retrieve the content, so that the content-certifier or associated user can certify (e.g., test/validate) the content. The access server may then transmit to the content-certifier an access token that that the content-certifier can use as a basis to obtain the content, optionally after the access server first determines that the content-certifier has the right to obtain the content.

Once the content-certifier has obtained the access token from the access-server, the content server may then send to the content-supplier a request for the content, providing the content-supplier with the access token. Given the access token, the content-supplier may then engage in communication with the access server to validate the token, i.e., to ensure that the access token is valid. Upon successful validation of the access token, the content-supplier may then transmit the content to the content-certifier, so that the content can be certified.

Preferably before the certification process occurs, or as part of the certification process, the content-certifier will validate the digital signature. For instance, the content-certifier may compute a new digital signature for the received content and may compare it to the digital signature indicated in the catalog-entry (which the content-supplier provided to the access server). Further, the content-certifier will evaluate the content itself to ensure that it has at least one expected characteristic. For example, the content may be a test script that defines functions for a testing system to carry out for testing equipment such as cell phones, and act of evaluating the content may involve ensuring that the test script defines one or more particular test functions. As another example, the content may be media such as audio or video, and the act of evaluating the content may involve ensuring that the media includes certain particular audio or video components (e.g., through digital pattern matching).

Upon successful certification (e.g., validation/testing) of the content, possibly including user input and analysis, the content-certifier will then preferably transmit to the access server a certification flag or other directive to certify the content. In turn, the access server will then preferably update the catalog-entry to indicate that the content is certified. Thereafter, a user searching for content may find the certified content listed in the access server's content-catalog and may advantageously rely on the certification when deciding to download the content.

In one respect, an exemplary embodiment of the invention may thus take the form of a method carried out by an access server or by another entity. The exemplary method may involve (i) receiving from a first computer a catalog-entry including a description of content and a digital signature for the content, (ii) providing a second computer with an access token for use by the second computer to obtain the content from the first computer, (iii) working with the first computer to validate the access token when the first computer receives the access token from the second computer as part of a request for the content, and (iv) receiving from the second computer a flag indicating that the content is certified, and responsively updating the catalog-entry to indicate that the content is certified.

Furthermore, the method may involve (v) providing the content from the second computer to a third computer (e.g., a client computer served by the second computer), and (vi) transmitting the flag from the third computer to the second computer, after successful evaluation of the content. Thus, the second computer may receive the flag from the second computer and then transmit the flag, to facilitate the flag-receiving function in element iv noted above.

In another respect, an exemplary embodiment may take the form of a method of certified publication of content. The method may involve (i) receiving from a first entity a catalog-entry for content, the catalog-entry including a content-description and a first digital signature generated by the first entity for the content, (ii) providing to a second entity an access token for use by the second entity to obtain the content from the first entity (e.g., if the second entity has a right to obtain the content), (iii) validating the access token when requested to do so by the first entity, wherein the first entity provides the second entity with the content after validation of the access token, (iv) receiving from the second entity a certification flag provided in response to successful evaluation by the second entity of the content received by the second entity from the first entity, and (v) responsive to receipt of the certification flag, updating the catalog-entry for the content, to indicate that the content is certified, whereby the updated catalog-entry is available for reference by a third entity.

In this or other methods, at least the first entity and the second entity may each comprise a client (e.g., a computer workstation) and a server (e.g., a network server that serves the client). Thus, the function of receiving the catalog-entry from the first entity may then comprise receiving the catalog-entry from a first server after the first server receives the catalog-entry from a first client. And receiving the certification flag from the second entity may comprise receiving the certification flag from a second server after the second server receives the second flag from a second client.

Further, in this or other methods, successful evaluation of the content by the second entity may involve (a) establishing a second digital signature of content received by the second entity from the first entity, and verifying that the second digital signature matches the first digital signature in the catalog-entry, and (b) testing the content to ensure that the content has at least one expected characteristic. In addition, this or other methods may further include the function of conducting the successful evaluation and then providing the flag from the second entity, in order to facilitate the flag-receiving function in element iv above.

In yet another respect, an exemplary embodiment of the invention may take the form of a system for certified publication of content. Such a system may include a first server on a packet-switched network (i.e., able to communicate on a packet-switched network), a second server on the packet-switched network, and a third server on the packet-switched network.

The first server may transmit to the second server a catalog-entry for content, with the catalog-entry including a content-description and a first digital signature for the content. The second server may transmit to the third server an access token for use by the third server to obtain content from the first server. The third server may present the access token to the first server, and the first server may communicate with the second server to validate the access token, and, upon successful validation of the access token, the first server may transmit the content to the third server. The third server may receive (e.g., from a served client station) a certification flag indicating successful evaluation of the content (e.g., testing of the content to ensure that it has at least one expected characteristic), and the third server may transmit the certification flag to the second server. And the second server may update the catalog-entry, in response to receipt of the certification flag, to indicate that the content is certified, and the updated catalog-entry may then be available for reference by a party browsing the content-catalog.

These and other aspects, advantages, and alternatives will become more apparent to those of ordinary skill in the art by reading the following detailed description, with reference where appropriate to the accompanying drawings.

DETAILED DESCRIPTION

Figure 1:
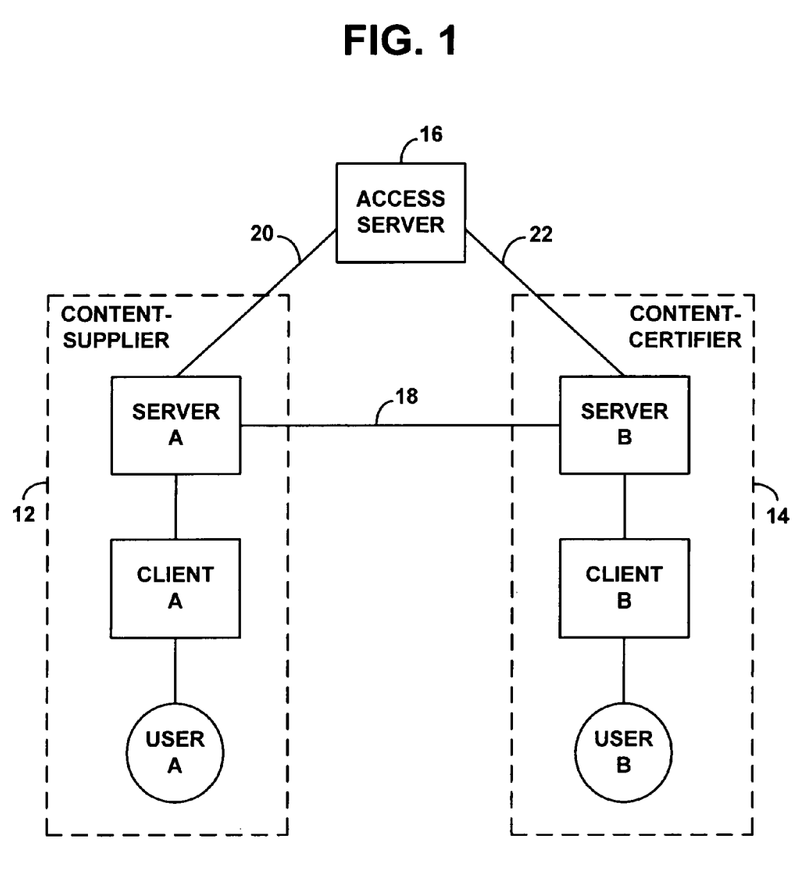
FIG. 1 is a block diagram of a network arrangement in which an exemplary embodiment of the invention can be carried out.

Referring to the drawings, FIG. 1 is a generalized network diagram depicting an arrangement in which an exemplary embodiment of the present invention can be implemented. It should be understood, however, that this and other arrangements described herein (including those described in the summary above) are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

The arrangement of FIG. 1 includes a first computer system 12, a second computer system 14, and an access-server (or third computer system) 16, all of which are arranged to communicate with each other over one or more network links or direct connections. As shown, for instance, system 12 may communicate with system 14 over a network link 18, system 12 may communicate with access-server 16 over a network link 20, and system 14 may communicate with access-server 16 over a network link 22. As a general matter, these network links can take any form, including one or more wired, wireless, circuit-switched and/or packet-switched components, for instance. By way of example, the network links may all be components of the public Internet.

Preferably, each of the systems 12, 14 includes at least one computer server and one client station (e.g., PC), with each client station being operable by a user. As shown in FIG. 1, for instance, system 12 may include a server A that serves a client A operated by a user A, and system 14 may include a server B that serves a client B operated by a user B.

Within each system, client-server communications preferably occur over a secure private network link, such as a LAN or VPN for instance, and all external communications pass through (or are conducted by) the server. Thus, in system 12, for instance, client A and server A may communicate with each other internally over a secure network link 24, and server A may communicate externally (with server B and access-server 16) over network links 18, 20. And in system 14, client B and server B may communicate with each other internally over a secure network link 26, and server B may communicate externally (with server A and access-server 16) over network links 18, 22. Alternatively, the various communication links may take other forms.

To facilitate this inter-node communication, each of the computers shown in FIG. 1 preferably includes a network interface of a type well known in the art. For instance, each computer may include an Ethernet network interface card and associated software to support wired or wireless Ethernet connectivity and IP communication over local and/or wide area packet-switched networks.

In practice, each of the computer systems 12, 14 may be owned and operated by a respective company, and access-server 16 may be owned and operated by yet another company. In an exemplary embodiment, for instance, system 12 may be owned and operated by a company that functions to generate (e.g., author or otherwise obtain or establish) content to be published, and thus system 12 may be considered a content-supplier. System 14 may be owned and operated by a company that functions to certify content being published, and thus system 12 may be considered a content-certifier. And access server may be owned and operated by a company that facilitates certified publication of content, including hosting of links to content, and providing for secure communication of content between systems 12 and 14, for instance. In an alternative embodiment, however, systems 12, 14 and access-server 16 may be co-owned or co-operated.

With the arrangement shown, user A may thus author or otherwise establish content and may invoke an application on client A to send the content from client A to server A, where the content may be stored for access by others. Access-server 16 may then obtain and list in an online content-catalog (or peer-to-peer content exchange, or the like) a link or other reference to the content maintained by server A (or more generally by system 12). And server B may acquire the content from server A and pass it to client B, where client B and/or user B (for instance) may validate and test the content to certify it. Upon successful certification of the content, user B may then direct client B to send a certification flag to server B, and server B may transmit the certification flag to access-server 16. Access-server 16 may then update the online content-catalog entry to indicate that the content has been certified.

As a general matter, the invention involves secure communication of content between entities such as system 12 and system 14. In an embodiment where system 14 is a content-certifier, for instance, the secure communication can help to ensure that system 14 receives content (to certify) only if system 14 is authorized to do receive the content, and the secure communication can further help to ensure that the content that system 14 receives to certify is in fact the content that system 12 is publishing for access by others. That way, certification of the content by system 14 can be advantageously relied upon by a third party that subsequently acquires the published content.

Figure 2:
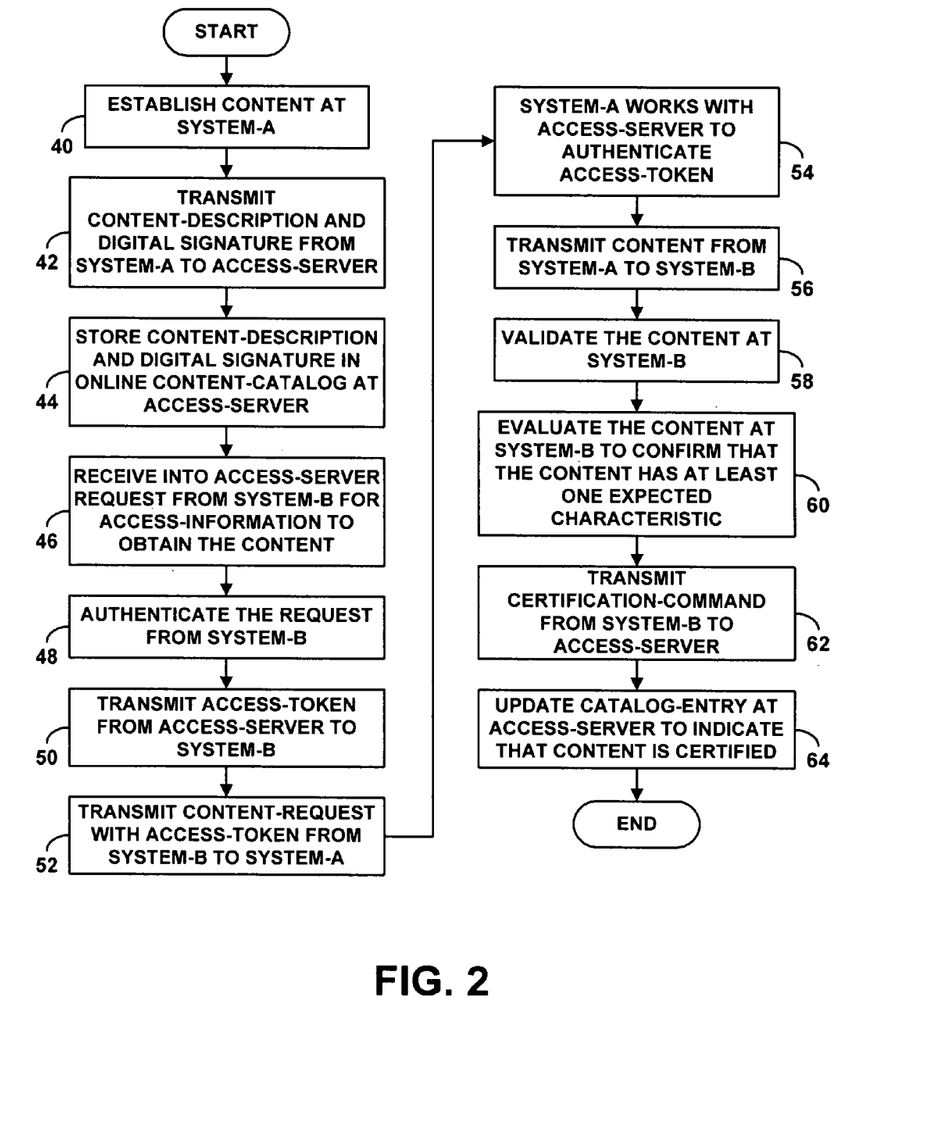
FIG. 2 is a flow chart depicting functions that can be carried out in accordance with the exemplary embodiment.

FIG. 2 is a flow chart depicting functions that can be carried out in accordance with the exemplary embodiment. As noted above, however, it should be understood that changes to these functions may be possible.

As shown in FIG. 2, at step 40, content is initially provided to server A. In the exemplary embodiment, the content can be authored or revised by user A and then transmitted from client A to server A over secure network link 24. In this regard, client A may be programmed with software that allows content-authoring (e.g., editing) and that is executable upon user-request to upload the authored content to server A. The software may also be executable to encrypt the content before uploading it to the server, using any encryption algorithm now known or later developed. Further, if the content comprises multiple files, the software may combine and compress the content into a zip file or the like before uploading it.

Preferably as part of the content-authoring process, user A or client A will prepare a description of the content, in the form of a markup document for instance, to facilitate listing of the content in an online content-catalog. The description may specify a content-title and ID and other characteristics or attributes of the content, such as author name, type of content, any functions of content, and the like. Further, the description may define permissions regarding the content, such as an indication of what other users or entities are allowed to access the content. Client A may then transfer the content-description together with the content to server A.

At step 42, server A transmits the content-description and a digital signature for the content to access-server 16, to allow access-server to list the content in an online-catalog. To facilitate this step, either client A or server A preferably computes a digital signature for the content, using any digital signature process now known or later developed. If client A computes the digital signature, client A may then transmit the digital signature together with the content and content-description to server A, for transmission of the digital signature and content-description from server A to access-server 16. On the other hand, server A may be programmed to itself compute the digital signature for the content and then transmit its own computed digital signature with the content-description to the access-server.

The content-description that server A transmits to access-server 16 may be identical to the content-description that client A provided to server A. Alternatively, the content-description may be some variant of the provided description. For instance, server A may change the structure of the content-description and may add/remove descriptors. Further, server A may encrypt and/or zip the content-description and digital signature for transmission to the access-server, for added security.

Ultimately, the access-server thereby receives from system 12 a content-description and associated digital signature for the underlying content, with the digital signature having been established by the content-supplier, such as by client A, server A, or some other entity of system 12. At step 44, the access-server then stores the content-description and digital signature in an online content-catalog, i.e., a content-catalog accessible by others over a communication network. Access-server 16 may maintain the content-catalog in a simple database and may then host an Active Server Pages (ASP) front-end, to allow web access to the catalog. In the event the access-server already had a catalog entry for the content provided by system 12 (e.g., for an earlier version of the content), the access-server may update or replace that catalog entry, so that the description and digital signature are the latest provided.

In the preferred embodiment, the access-server will mark the content-description "provisional" in its content-catalog, which means that the content has not yet been certified. This is a signal to potential third parties seeking the content that the content is not yet certified, i.e., that it is not yet clear whether the content is what it purports to be. (Further, when content is marked as "provisional," the access-server may make the catalog-entry for that content invisible to third parties, to protect third parties from unwittingly downloading the content.) Access-server 16 may then further send a notification-message automatically to server B, to notify system 14 that provisional content is available to be certified. The notification-message may provide the content-description for the content or may provide one or more select portions of the content-description.

At step 46, access-server 16 thereafter receives a request-message from system 14 seeking access-information for the provisional content, to allow system 14 to obtain the content from system 12. In practice, this request will preferably originate from user B. In particular, when server B receives the notification-message from access server 16, server B may pass the notification-message along to client B for reference by user B, and user B may generate the request in response. Alternatively, user B may request from server B, and server B may in turn request from access-server 16, a list of any/all provisional content available to be certified—possibly all such content matching certain parameters/types specified by user B. Access-server 16 may then return to server B a list of such content, and server B may pass the list along to client B. And user B may then generate the request in response. In any event, client B may be programmed with software through which user B may generate and send this request to server B, triggering server B to send the request in turn to access-server 16.

Upon receipt of the request-message, at step 48, access-server 16 then authenticates the request. Preferably, this authentication process will involve confirming, by reference to stored profile data for instance, that system 14 as a whole has the right to access the content. The stored profile data may comprise subscription-data or the like maintained in data storage by access-server 16. Alternatively or additionally, the stored profile data may comprise permission data that system 12 included with the content-description as noted above.

Any client- or user-level authentication within system 14 will preferably be done by server B. However, upon receipt of the request-message from system 14, access-server may authenticate system 14 as a whole, regardless of which client or user originated the request. Thus, server B may include as part of its request to the access-server a set of authentication credentials (e.g., username and password) for the content-certifier company as well as an identifier of the requested content. Access-server 16 may then authenticate the content-certifier company by reference to stored profile data, to confirm that the content-certifier requesting the content is a legitimate recipient (and perhaps a legitimate certifier) of the content.

At step 50, if access-server 16 successfully authenticates the request from server B, it then returns to server B an access-token that server B can use to obtain the content from server A. Access-server 16 may randomly generate the access-token (e.g., as a GUID/UUID). Further, access-server 16 will preferably store the generated access-token in a data record associated with both server B (or system 14) and the requested content (by content ID), for later reference and validation. In the event server A is not at a known network address or otherwise is not openly accessible to server B, the access-server may also transmit to server B a network address (such as an IP address or content-specific URL) of server A. The access-server may transmit the network address and access-token in an integral manner, such as with one as a query parameter concatenated with the other for instance.

Next, at step 52, server B will request the content from server A, transmitting the request to a previously known network address of server A or to the address designated by the access-server 16. Server B may send this content-request upon receipt of the access-token or may instead notify client B/user B of receipt of the access-token, and user B may at some later time direct client B/server B to send the content-request. In any event, when server B sends the content-request to server A, server B will include with the content-request the access-token that the access-server 16 provided.

At step 54, upon receipt of the content-request message with access-token from server B, server A will next work with the access-server to validate the access-token. In an exemplary embodiment, this process may involve (i) server A transmitting to the access-server a validation request including the access-token and an identifier of the requesting party (e.g., server B), (ii) the access-server referencing its stored data record regarding the access-token, and (iii) the access-server returning a positive validation response to server A. Alternatively, the process may take other forms. In any event, at step 56, upon successful validation of the access-token, server A then transmits the requested content to server B, to facilitate certification of the content.

The process of certifying content may itself take various forms. In exemplary embodiment, however, as noted above, the certification process preferably comprises validating the content and evaluating the content to ensure the content has at least one expected characteristic. Within system 14, the validation and evaluating functions may be carried out by different entities. For instance, server B may carry out the validation function and, upon successful validation, may then pass the content along to client B for evaluation. Alternatively, server B may simply pass the content along to client B, and client B may carry out both the validation and evaluation functions. In a preferred embodiment, user B will be involved in the evaluation process as well.

Thus, at step 58, the content may be validated by system 14. To validate the content, server B or client B may compute a digital signature for the content and then compare the computed digital signature to the digital signature that was specified in the content-description at the access-server. (Preferably, the entity computing the digital signature would have received the content-description earlier in the process, such as with notification of the provisional content.) This process assumes that the systems would use a common digital signature computation process/algorithm. Thus, if the digital signatures match, system 14 can programmatically conclude that the content provided by server A for certification is the same content that the catalog-entry indicates is to be available for access.

At step 60, the content will next be evaluated by system 14 to ensure that it has at least one expected characteristic. As noted above, this evaluation process can take various forms, depending on the type of content at issue. For example, if the content is a particular audio or video file (as indicated by its content-description for instance), the evaluation can comprise conducting computerized pattern matching to ensure that the file contains certain digital bit patterns indicative of that particular audio or video. As another example, if the content is purportedly a particular program or script that is to define or carry out particular functions, the evaluation process can comprise reviewing or testing the program or script to ensure that it defines or carries out the particular functions. Furthermore, if the content-description indicates that the content has a particular characteristic, the evaluation process may involve testing the content to ensure that it in fact has the characteristic indicated. The evaluation process may be wholly automated. Alternatively, the evaluation process may involve user input/judgment. Further, user B and/or client B may authorize and signal the completion of the evaluation process.

At step 62, after successful certification (e.g., successful validation and evaluation) of the content, system 14 sends to access-server a certification-flag or other indication of that the content is certified. In a preferred embodiment, system 14 will further compute a new digital signature for the content, with the new digital signature reflecting the state of the content as provided by the content-supplier (system 12) and as certified. System 14 will then transmit the new digital signature together with the certification-flag to the access-server 16. At step 64, in response to the certification-flag, the access-server will then update the catalog-entry for the content, to change the "provisional" indication to "certified" and to specify the new digital signature. Further, the access-server may make the catalog-entry visible to third parties if it was not visible already.

After completion of the process illustrated by FIG. 2 (or an analogous process), a third party desiring to access the content listed in the online content-catalog may advantageously rely on its certified status. In an exemplary embodiment, for instance, a user may browse to or otherwise visit a web site hosted by the access-server 16 and click on a link to certified acquire the content from server A.

Figure 3:
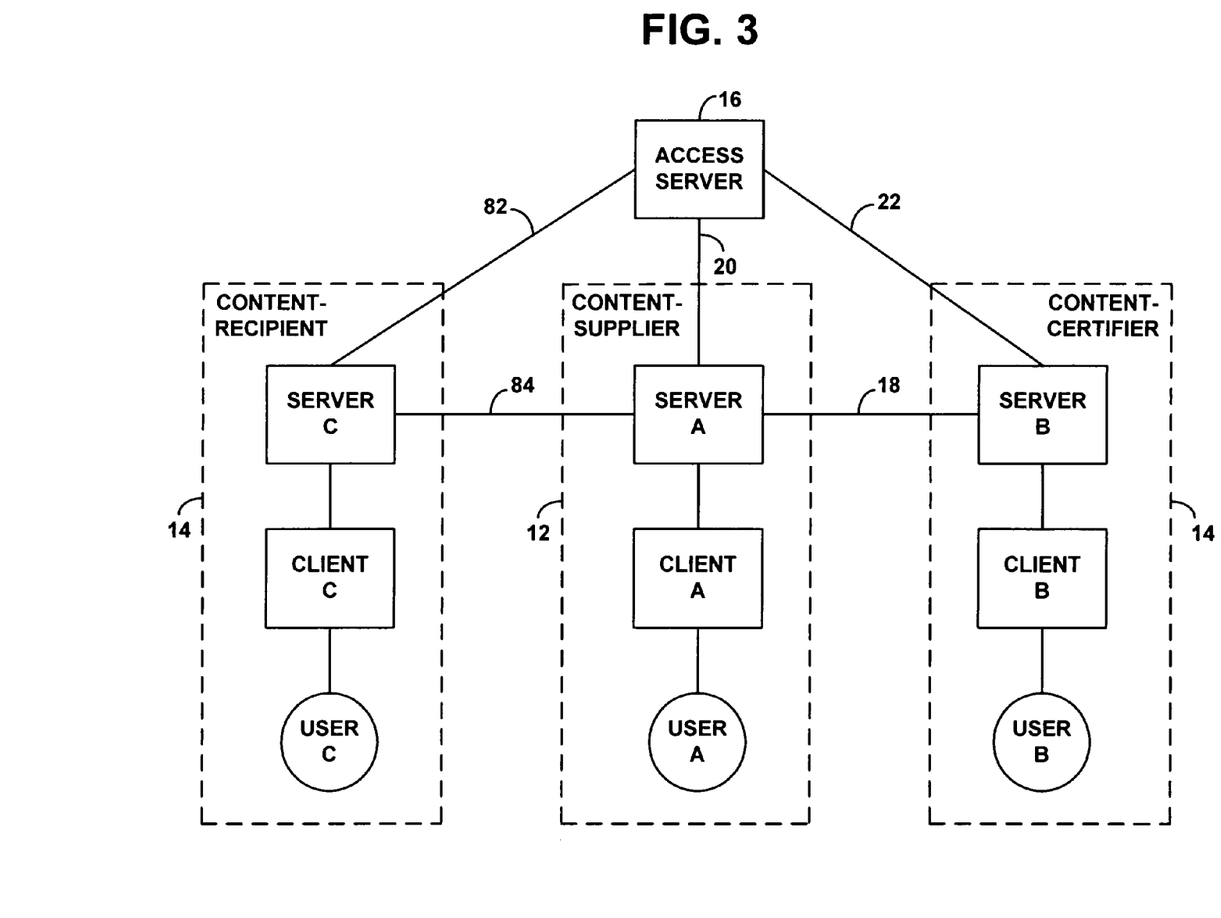
FIG. 3 is a block diagram of a further network arrangement in which the exemplary embodiment can be carried out.

In the exemplary embodiment, the process by which the content-certifier acquires content as described with respect to FIG. 2 can be applied analogously when a third party seeks to acquire the certified content (or indeed when any party seeks to acquire the content, whether certified already or not). FIG. 3 illustrates an example scenario in which this could occur.

In particular, FIG. 3 adds another computer system 80, which, like systems 12 and 14, could include at least one server and one client operated by a user. In particular, system 80 may include a server C and a client C, with the client C being operated by a user C. Alternatively, system 80 may include more or fewer components. As illustrated, server C may be connected by a network link 82 with access-server 16 and by a network link 84 with server A of system 12, and both of these links may be components of a common network such as the public Internet.

System 80 may be owned and operated by a company or other entity that receives content supplied by a content-supplier, to use the content for one purpose or another, and thus system 80 may be considered a content-recipient. For example, if the content comprises a test script for testing cell phones or other equipment, system 80 may be owned and operated by a company that conducts such tests. Such a company may have a need to acquire a test script from the content-supplier in order to be able to run one or more tests as defined by the script. More particularly, client C and/or user C might need to acquire the test script in order to apply or otherwise use the test script in practice. (As another example, the content could comprise test-results, compiled and published after testing of cell phones or other equipment. In that case, the content-recipient could be a company that needs to review the test results, such as to determine whether the cell phones or other equipment meet expectations.)

The process by which system 80 acquires content from system 12 may thus involve steps that parallel those described above. In particular, at some point after server A has uploaded a content-description for the content to the access-server, server C (at the request of client C for instance) may send a request-message to access-server 16, seeking access-information for the content. Access-server 16 may then authenticate system 80, such as by reference to stored profile data that might indicate whether system 80 has permission to obtain the content (again possibly as indicated by the content-author or more generally by system 12). Assuming successful authentication, access-server 16 may then return to server C an access-token that server C can use to acquire the content from server A, perhaps together with a network address of server A.

Thereafter, server C may request the content from server A by transmitting a request with the access-token to server A. Server A may then work with the access-server 16 to validate the access-token. And assuming successful validation of the access-token, server A may then transmit the content to server C, and server C may transmit the content in turn to client C for receipt and use by client C and/or user C. Further, server C and/or client C may validate the received content by computing a digital signature for the content and comparing it with the digital signature specified for the content in the content-description at the access-server. Assuming the digital signature matches, client C and/or user C may then use the content. Furthermore, if the content had been certified by system 14, client C and/or user C may rest easy with the understanding that the content is likely or certainly what it purports to be.

Figure 4:
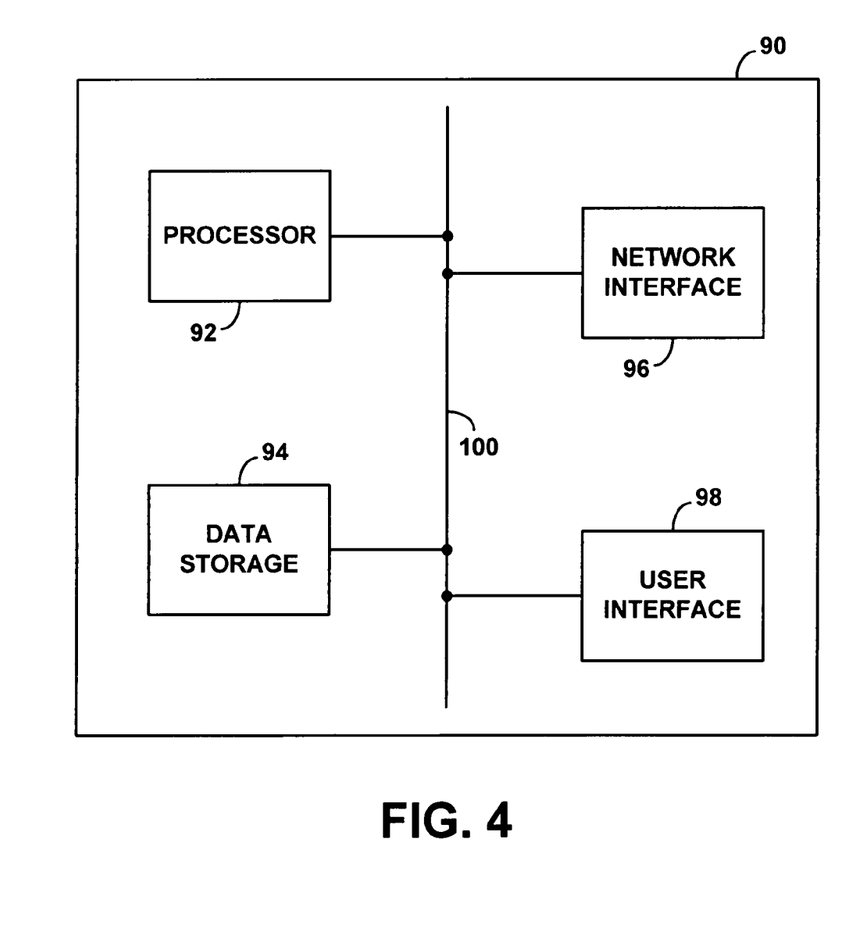
FIG. 4 is a block diagram of a representative computer for use within the exemplary network arrangements.

Finally, FIG. 4 is a simplified block diagram of a computer 90, which is representative of most any of the computers shown in the other figures and described above. As shown in FIG. 4, the representative computer includes a processor 92, data storage 94, a network interface 96, and a user-interface 98, all of which may communicatively linked together by a system bus, network, or other mechanism 100.

Processor 92 may comprise one or more general purpose processors (e.g., INTEL microprocessors) and/or one or more specialized processors (such as digital signal processor chipsets). Data storage 94, in turn, may comprise volatile and/or non-volatile storage components, such as optical, magnetic, or organic storage, and may be integrated in whole or in part with processor 92. In the exemplary embodiment, data storage 94 may contain program instructions executable by processor 92 to carry out the functions described above (for the computer at issue). Further, data storage 94 may contain other data, including content, content-descriptions, access-codes, and the like.

Network interface 96 comprises a mechanism for communicatively linking the representative computer with one or more networks. As noted above, the network interface 96 may thus comprise an Ethernet network interface module for wired or wireless Ethernet connectivity, or it may take other forms now known or later developed.

User-interface 98, in turn, functions in a conventional manner to facilitate user interaction. User-interface 98 may include user-output components such as a display screen and audio speaker. Further, user-interface 98 may include user-input components such as a keyboard/keypad, mouse, and microphone.

An exemplary embodiment of the present invention have been described above. Those skilled in the art will understand, however, that changes and modifications may be made to the embodiment described without departing from the true scope and spirit of the present invention, which is defined by the claims.

I claim:

1. A method of certified publication of content, the method comprising:
    an access server receiving from a first entity a catalog-entry for content, the catalog-entry including a content-description and a first digital signature generated by the first entity for the content;
    the access server providing to a second entity an access token for use by the second entity to obtain the content from the first entity, and conditioning the providing of the access token to the second entity on a determination that the second entity has a right to obtain the content;
    the access server validating the access token when requested to do so by the first entity, wherein the first entity provides the second entity with the content after validation of the access token;
    the access server receiving from the second entity a certification flag provided in response to successful evaluation by the second entity of the content received by the second entity from the first entity, wherein successful evaluation of the content by the second entity comprises (i) establishing a second digital signature of content received by the second entity from the first entity, and verifying that the second digital signature matches the first digital signature in the catalog-entry and (ii) testing the content to ensure the content has at least one expected characteristic;
    responsive to receipt of the certification flag, the access server updating the catalog-entry for the content, to indicate that the content is certified, whereby the updated catalog-entry is available for reference by a third entity.

2. The method of claim 1, wherein the content is encrypted.

3. The method of claim 1, wherein the content comprises a test script, and wherein the at least one expected characteristic comprises at least one test script function.

4. The method of claim 1, wherein the content comprises media selected from the group consisting of audio and video, and wherein the at least one expected characteristic comprises a characteristic selected from the group consisting of predefined audio and predefined video.

5. The method of claim 1,
    wherein the first entity comprises a first client and a first server, wherein receiving the catalog-entry from the first entity comprises receiving the catalog-entry from the first server after the first server receives the catalog-entry from the first client; and
    wherein the second entity comprises a second client station and a second server, wherein receiving the certification flag from the second entity comprises receiving the certification flag from the second server after the second server receives the certification flag from the second client.

6. The method of claim 5, further comprising:
    conducting the successful evaluation of the content, and providing the certification flag from the second entity.

7. The method of claim 6, wherein the content comprises a test script, and wherein testing the content to ensure the content has at least one expected characteristic comprises testing the content to ensure the test script defines at least one test script function.

8. The method of claim 6, wherein the content comprises media selected from the group consisting of audio and video, and wherein testing the content to ensure the content has at least one expected characteristic comprises testing the content to ensure the media comprises media selected from the group consisting of predefined audio and predefined video.

9. A system for certified publication of content comprising:
    a first server on a packet-switched network;
    a second server on the packet-switched network; and
    a third server on the packet-switched network,
    wherein the first server transmits to the second server a catalog-entry for content, the catalog-entry including a content-description and a first digital signature for the content,
    wherein the second server transmits to the third server an access token for use by the third server to obtain the content from the first server and conditions providing the access token to the third server on a determination that the third server has a right to obtain the content,
    wherein the third server presents the access token to the first server, and, upon receiving the access token from the third server, the first server communicates with the second server to validate the access token, and, upon successful validation of the access token, the first server transmits the content to the third server,
    wherein the third server receives a certification flag indicating successful evaluation of the content, and the third server transmits the certification flag to the second server, wherein successful evaluation of the content comprises (i) establishing a second digital signature of content, and verifying that the second digital signature matches the first digital signature in the catalog-entry and (ii) testing the content to ensure the content has at least one expected characteristic, and
    wherein the second server updates the catalog-entry, in response to receipt of the certification flag, to indicate that the content is certified, whereby the updated catalog-entry is available for reference by a party browsing a content catalog.

10. The system of claim 9, wherein successful evaluation of the content comprises testing the content to ensure that the content has at least one expected characteristic.

11. The system of claim 9, wherein the content is encrypted.

12. The system of claim 9, wherein the content comprises a test script, and wherein the at least one expected characteristic comprises at least one test script function.

13. The system of claim 9, wherein the content comprises media selected from the group consisting of audio and video, and wherein the at least one expected characteristic comprises a characteristic selected from the group consisting of predefined audio and predefined video.

* * * * *